Jan. 9, 1968    W. H. ITO ETAL    3,362,658

VEHICLE TRAJECTORY CONTROL APPARATUS

Filed July 30, 1964    2 Sheets-Sheet 1

INVENTORS.
WALLACE H. ITO
& JOHN E. TUSHIE
BY Gordon Reed
ATTORNEY

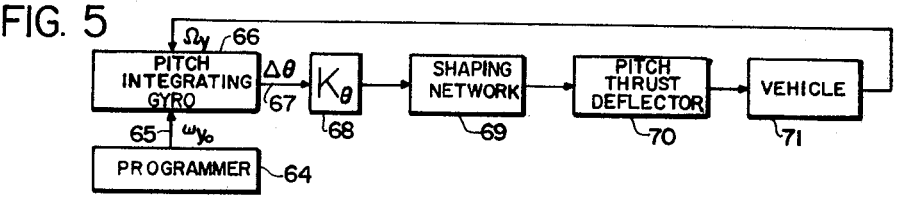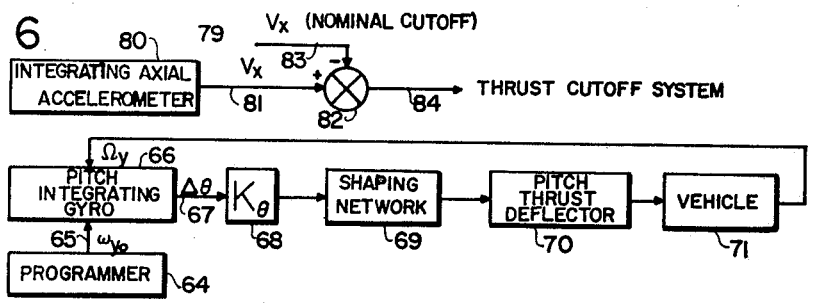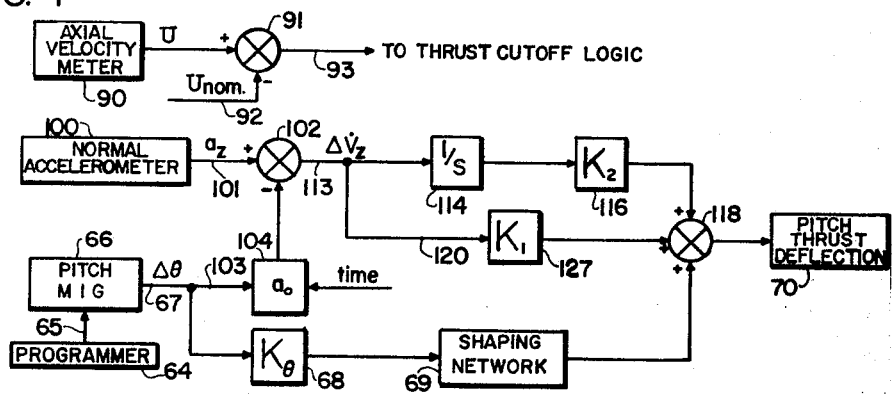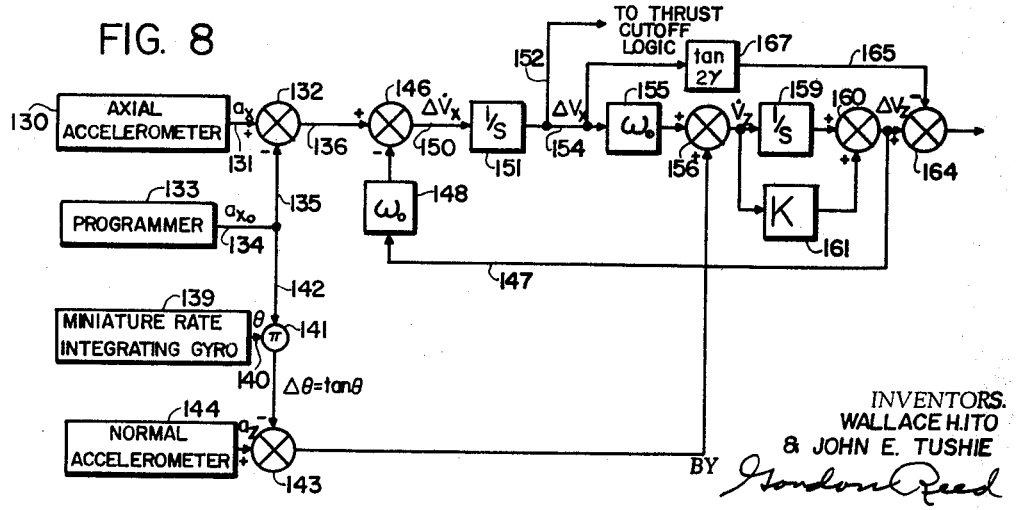

3,362,658
VEHICLE TRAJECTORY CONTROL APPARATUS
Wallace H. Ito, Minneapolis, and John E. Tushie, St. Louis Park, Minn., assignors to Honeywell Inc., Minneapolis, Minn., a corporation of Delaware
Filed July 30, 1964, Ser. No. 386,306
11 Claims. (Cl. 244—3.2)

This invention pertains to vehicle guidance systems or techniques for the steering of craft such as unmanned rockets. The function of such guidance systems extends beyond that of stabilizing a vehicle about its three axes. It determines and may command changes in craft flight in order to follow a desired course or a desired trajectory. The invention thus relates to the path control problem for a vehicle. When applied to a vehicle, such as an intermediate range ballistic missile, the guidance system as that herein functions to control the vehicle trajectory until propulsion thrust is terminated. Thereafter, following termination of thrust or thrust cut-off no control is applied by the guidance system to alter the forward velocity vector of the vehicle.

Present aerospace vehicle guidance techniques for indicating or commanding a future course of a vehicle, such as a rocket propelled missile, fall into two general categories: control of the state vector of a vehicle having displacement, velocity, and acceleration components by use of a four-gimbal platform as the basic sensing element (pure inertial guidance); and control of a variable indirectly related to the state vector, such as body attitude, by use of vehicle body-mounted sensors. Guidance for rocket propelled missiles, to which the subject invention could apply, are discussed in the January 1958 issue of Jet Propulsion, pp. 17–24. Such discussed guidance systems may include an inertial guidance.

In the first category, the typical pure inertial guidance system is extremely accurate but requires auxiliary computing before steering commands for further control of the state vector can be generated; hence, the total system is complex and expensive.

In the second category, the typical body mounted sensors system which need no auxiliary computer is relatively inexpensive but its accuracy depends heavily upon programming based on predictable, nominal, vehicle configurations and launch conditions of the vehicle.

Many present and future space missions require guidance systems with accuracies better than that of a body-attitude system, but the mechanization must stay well below the cost and complexity of guidance systems using four-gimbal platforms. This requirement leads to the alternative of upgrading the body-attitude system, wherein the error control signal is the difference between programmed and actual craft performance, or downgrading the four-gimbal platform system.

An object of this invention is to upgrade the body-attitude system. The above object was posed during the formulation of the mission profiles for space vehicles and can be stated as follows: "How can one utilize the basic attitude sensors in a space vehicle autopilot so that they comprise a 'back-up' guidance and navigation system?"

The second consideration which led to the object of upgrading the body-attitude system is often posed to preliminary designers and can be stated as follows: "Assuming that the inertial sensor components are 'strapped down' to the vehicle frame, is there a relatively inexpensive guidance technique which can be applied to short-range tactical missiles, such as the antisubmarine rocket (ASROC) as well as to the missiles of the IRBM class?"

Although these two considerations involved in the object of the invention originate from distinctly separate areas of concern, it is apparent to guidance and control engineers that both problems may be approached with the same kind of technique, namely, the upgraded body-attitude control system.

One of these techniques provided by the subject invention has been termed "P-Matrix Guidance" herein and belongs to the perturbation class of missile guidance techniques. P-Matrix guidance has the following characteristics: P-Matrix guidance is specifically oriented toward inertial components which are strapped down to the frame of the vehicle; and P-Matrix guidance methods are general in nature and can be applied to the design and analysis of guidance systems for relatively simple missiles like the antisubmarine rocket missile, ASROC, and for high-performance test missiles like Hibex for testing components.

The basic method of approach in order to derive the craft control error equations is to write the nonlinear equations of motion in the body-axis coordinate system $x$, $y$, $z$, with the center of the earth as the origin. The non-linear equations having time as a variable are then solved over a time period for an ideal reference trajectory. Linear perturbation equations (to be developed later), or the first variational set, are then written about the reference trajectory. The perturbation equations yield errors which can be nulled to steer back to the ideal reference trajectory to solve the path control problem or shaped to select a new reference trajectory as a function of measured inflight variations. In other words, mechanization of the perturbation equations with strapped-down sensors allows trajectory errors to be computed. Steering signals are thus generated to compensate for the errors. P-Matrix guidance provided herein contributes something new in the art in that the control laws are determined by consideration of the body-axis reference system and not from inertial platform information. The resulting steering corrections for the vehicles state vector are determined by errors detectable by body-mounted sensors and, hence, the resulting guidance system is independent of a vehicle inertial reference system. The above object and other objects of the invention will become apparent from the following description taken in conjunction with the accompanying drawings, in which:

FIGURE 1 is a vehicle with body axes represented;

FIGURE 2 is kinematic model of the preprogrammed nominal frame $B_0$ and the actual body frame B;

FIGURE 3 is vehicle depicted with body axes rates;

FIGURE 4 is a functional block diagram of a typical yaw-roll scheme;

FIGURE 5 is a functional block diagram of an alpha one configuration;

FIGURE 6 is functional block diagram of an alpha two configuration; and

FIGURE 7 is functional block diagram of an alpha three configuration; and

FIGURE 8 is functional block diagram of an alpha four configuration.

DERIVATION OF THE P-MATRIX PERTURBATION EQUATIONS

General derivation

Since it is assumed that the inertial sensors—which could consist of three gyros and three accelerometers—are all strapped down to the frame of the vehicle, the derivation of the perturbation equations using the technique of vector algebra is simpler if it is performed in the context of the vehicle body axes (see FIGURE 1).

As is normal with perturbation procedures, it is advisable to have a reasonably precise model before "perturbing" the model in the mathematical sense. A more complete kinematic model than that afforded by FIGURE 1 is demanded because it is expected that small deviations will occur in velocity components, displacement components, and attitude angles. Deviations are measured from the nominal values along the ideal or nominal trajectory. The kinematic model used is depicted in FIGURE 2.

Let $\Delta \overline{R} = \overline{R} - \overline{R}_0$, the perturbed displacement vector, and let $\Delta \overline{V} = \overline{V} - \overline{V}_0$, the perturbed linear velocity vector. Then using the expression for differentiating a vector, the following relations can be written:

$$\left[\frac{d(\Delta \overline{R})}{dt}\right]_B = \frac{d(\Delta \overline{R})}{dt} - \overline{\Omega}_B \times \Delta \overline{R} \quad (1)$$

$$\left[\frac{d(\Delta \overline{V})}{dt}\right]_B = \frac{d(\Delta \overline{V})}{dt} - \overline{\Omega}_B \times \Delta \overline{V} \quad (2)$$

where $\overline{\Omega}_B$ is the angular velocity vector of the actual vehicle body frame and where the symbol, $$\left[\frac{d(\ )}{dt}\right]_B$$

indicates time-differentiation with respect to frame B.

If the assumption is made that $\Delta \overline{R}$ and $\Delta \overline{V}$ are first variations of $\overline{R}$ and $\overline{V}$, the symbols $\Delta$ and $d/dt$ may be interchanged, so that Equations 1 and 2 may be rewritten as:

$$\left[\frac{d(\Delta \overline{R})}{dt}\right]_B = \Delta\left(\frac{d\overline{R}}{dt}\right) - \overline{\Omega}_B \times \Delta \overline{R} \quad (3)$$

$$\left[\frac{d(\Delta \overline{V})}{dt}\right]_B = \Delta\left(\frac{d\overline{V}}{dt}\right) - \overline{\Omega}_B \times \Delta \overline{V} \quad (4)$$

Then, in turn, since $$\frac{d\overline{R}}{dt} = V, \text{ and } \frac{d\overline{V}}{dt} = \overline{A}$$

the inertial acceleration, Equations 3 and 4 can be written as follows:

$$\left[\frac{d(\Delta \overline{R})}{dt}\right]_B = \Delta \overline{V} - \overline{\Omega}_B \times \Delta \overline{R} \quad (5)$$

$$\left[\frac{d(\Delta \overline{V})}{dt}\right]_B = \Delta \overline{A} - \overline{\Omega}_B \times \Delta \overline{V} \quad (6)$$

The inertial linear acceleration vector, $\overline{A}$, can be represented as $$\overline{A} = \overline{a} + \overline{g} \quad (7)$$

where $\overline{g}$ is the gravitational acceleration vector and $\overline{a}$ is the "g-less" acceleration vector.

On perturbing Equation 7, the following obtains:

$$\Delta \overline{A} = \Delta \overline{a} + \Delta \overline{g} \quad (8)$$

For many missile guidance problems, it is reasonable to assume that $\Delta \overline{g} = 0$. In many other guidance problems, however, an explicit nonzero expression for $\Delta \overline{g}$ is required. Then, Equations 5 and 6 are rewritten as:

$$\frac{d(\Delta \overline{R})}{dt} = \Delta \overline{V} - \overline{\Omega}_B \times \Delta \overline{R} \quad (10)$$

$$\frac{d(d\overline{V})}{dt} = \Delta \overline{a} - \overline{\Omega}_B \times \Delta \overline{V} \quad (11)$$

where the symbol $d(\ )/dt$ is understood to mean time-differentiation with respect to frame B, the actual body frame. Equations 10 and 11 can also be written in matrix-vector notation as follows:

$$\frac{d(\Delta \overline{R})}{dt} = P(t)\Delta \overline{R} + \Delta \overline{V} \quad (12)$$

with $P(t)$ defined below.

$$\frac{d(\Delta \overline{V})}{dt} = P(t)\Delta \overline{V} + \Delta \overline{a} \quad (13)$$

where $$\Delta \overline{R} = \begin{bmatrix} \Delta_x \\ \Delta_y \\ \Delta_z \end{bmatrix}, \quad \Delta \overline{V} = \begin{bmatrix} \Delta V_x \\ \Delta V_y \\ \Delta V_z \end{bmatrix}, \quad \Delta \overline{a} = \begin{bmatrix} \Delta a_x \\ \Delta a_y \\ \Delta a_z \end{bmatrix}$$

and $$P(t) = \begin{bmatrix} 0 & \omega_z & -\omega_y \\ -\omega_z & 0 & \omega_x \\ \omega_y & -\omega_x & 0 \end{bmatrix} = -[\overline{\Omega}_B x]$$

The angular rates, $\omega_x$, $\omega_y$, and $\omega_z$, are roll rate, pitch rate, and yaw rate, respectively; the sense of these angular rates is indicated in FIGURE 3.

Equations 12 and 13 can be interpreted as *navigational* equations provided the attitude deviations are small. Here, the term navigational equations means that displacement, $\Delta \overline{R}$, and velocity, $\Delta \overline{V}$, are outputs of the equations. It is appropriate, then, to observe that Equation 13 could be interpreted as a time varying linear filter with input $\Delta \overline{a}$, the perturbed, g-less acceleration and with output $\Delta \overline{V}$, the perturbation in inertial velocity. The second or displacement-generating navigational loop is defined by Equation 12 wherein $\Delta \overline{V}$ is the input and $\Delta \overline{R}$, the perturbation in inertial displacement, is the output. Thus, Equations 12 and 13 comprise the inertial navigation equations, in a perturbation sense, for rotating body axes.

In order to use the error Equations 12 and 13 as a basis for designing a *guidance* system to command where the vehicle is to go, it is necessary to modify them and to augment these equations with a set of attitude perturbation equations.

The derivation of the attitude perturbation equation is included, in the event of interest. The matrix equation is:

$$\frac{d}{dt}\begin{bmatrix} \Delta \phi \\ \Delta \theta \\ \Delta \psi \end{bmatrix} = \begin{bmatrix} \Omega_x \\ \Omega_y \\ \Omega_z \end{bmatrix} - \begin{bmatrix} 1 & \Delta \psi & -\Delta \theta \\ -\Delta \psi & 1 & \Delta \phi \\ \Delta \theta & -\Delta \phi & 1 \end{bmatrix} \begin{bmatrix} \omega_x \\ \omega_y \\ \omega_z \end{bmatrix} \quad (14)$$

where $\Delta \phi$, $\Delta \theta$, and $\Delta \psi$ are small perturbations in the Euler angles $\theta$ (pitch), $\phi$ (roll), and $\psi$ (yaw), respectively.

$$\frac{d}{dt}\begin{bmatrix} \Delta \phi \\ \Delta \theta \\ \Delta \psi \end{bmatrix} = \begin{bmatrix} \Omega_x \\ \Omega_y \\ \Omega_z \end{bmatrix} - \begin{bmatrix} 1 & \Delta \psi & -\Delta \theta \\ -\Delta \psi & 1 & \Delta \phi \\ \Delta \theta & -\Delta \phi & 1- \end{bmatrix} \quad (14)$$

This equation follows from two results from classical kinematics: (1) the formula for differentiation of a vector relative to rotating axes and (2) the fact that perturbational angular displacements like $\Delta \psi$, $\Delta \phi$, and $\Delta \theta$ can be treated as components of a vector.

As a classical reference for the formula for differentiating a vector with respect to a rotating frame, reference is made to the text book: "Introduction to Theoretical Physics," by Leight Page Ph.D., 2nd edition, Fourth Printing Van Nostrand, New York, page 104, lines 33 and 34 and page 105, lines 1, 2, and 3. The indicated material is quoted:

"Problem 32c. If we denote by $d\overline{v}/dt$ the time derivative of the vector $\overline{v}$ relative to a set of axes $X_0Y_0Z_0$ fixed in an inertial system and by $d\overline{v}/dt$ the time derivative of the vector $\overline{v}$ relative to a rotating set of axes XYZ with the same origin, prove that $$\frac{d\overline{v}}{dt} = \frac{d\overline{v}}{dt} + \overline{\omega} x \overline{v}"$$

Assuming that one can choose $$\begin{bmatrix} \Delta \phi \\ \Delta \theta \\ \Delta \psi \end{bmatrix}$$

as the arbitrary vector, $\overline{v}$, as used in the aforequoted passage from Page's book, and using the actual body frame (roll, pitch, yaw axes) as the rotating axes under question, the substitution of $$\begin{bmatrix} \Delta \phi \\ \Delta \theta \\ \Delta \psi \end{bmatrix}$$

for $\bar{v}$ in Page's formula results in:

$$\frac{d}{dt}\begin{bmatrix}\Delta\phi\\\Delta\theta\\\Delta\psi\end{bmatrix}=\frac{d}{dt}\begin{bmatrix}\Delta\phi\\\Delta\theta\\\Delta\psi\end{bmatrix}+\bar{\omega}x\begin{bmatrix}\Delta\phi\\\Delta\theta\\\Delta\psi\end{bmatrix}$$

The linear operator "$\bar{\omega}x$" is identified with to "$\bar{\Omega}_{B_0}x$" in the original patent application and, in matrix form, $$[-\bar{\Omega}_{B_0}x]=P(t)=\begin{bmatrix}0 & \omega_z & -\omega_y\\-\omega_z & 0 & \omega_x\\\omega_y & -\omega_x & 0\end{bmatrix}$$

Thus, Page's equation becomes:

$$\frac{d}{dt}\begin{bmatrix}\Delta\phi\\\Delta\theta\\\Delta\psi\end{bmatrix}=\frac{d}{dt}\begin{bmatrix}\Delta\phi\\\Delta\theta\\\Delta\psi\end{bmatrix}-P(t)\begin{bmatrix}\Delta\phi\\\Delta\theta\\\Delta\psi\end{bmatrix}$$

The left-hand side of Page's equation can be written as:

$$\frac{d}{dt}\begin{bmatrix}\Delta\phi\\\Delta\theta\\\Delta\psi\end{bmatrix}=\Delta\begin{bmatrix}\dot\phi\\\dot\theta\\\dot\psi\end{bmatrix}$$

since $d/dt$ and $\Delta$ can be interchanged (as explained in "Methods of Applied Mathematics" by F. B. Hildebrand, Prentice-Hall, New York, 1952, page 132, lines 16, 17, and 18).

The difference between preprogrammed rates and measured rates is:

$$\Delta\begin{bmatrix}\dot\phi\\\dot\theta\\\dot\psi\end{bmatrix}=\begin{bmatrix}\Omega_x\\\Omega_y\\\Omega_z\end{bmatrix}-\begin{bmatrix}\omega_x\\\omega_y\\\omega_z\end{bmatrix}$$

—up to first-order terms.

With the expression for $$\Delta\begin{bmatrix}\dot\phi\\\dot\theta\\\dot\psi\end{bmatrix}$$

Page's equation becomes:

$$\begin{bmatrix}\Omega_x-\omega_x\\\Omega_y-\omega_y\\\Omega_z-\omega_z\end{bmatrix}=\frac{d}{d\tau}\begin{bmatrix}\Delta\phi\\\Delta\theta\\\Delta\psi\end{bmatrix}-P(t)\begin{bmatrix}\Delta\phi\\\Delta\theta\\\Delta\psi\end{bmatrix}$$

By transposing terms in the foregoing equation and by replacing $\tau$ by $t$, the following equation obtains:

$$\frac{d}{dt}\begin{bmatrix}\Delta\phi\\\Delta\theta\\\Delta\psi\end{bmatrix}=P(t)\begin{bmatrix}\Delta\phi\\\Delta\theta\\\Delta\psi\end{bmatrix}+\begin{bmatrix}\Omega_x-\omega_x\\\Omega_y-\omega_y\\\Omega_z-\omega_z\end{bmatrix}$$

Writing in $P(t)$ in its full matrix form, the foregoing equation becomes:

$$\frac{d}{dt}\begin{bmatrix}\Delta\phi\\\Delta\theta\\\Delta\psi\end{bmatrix}=\begin{bmatrix}0 & \omega_z & -\omega_y\\-\omega_z & 0 & \omega_x\\\omega_y & -\omega_x & 0\end{bmatrix}\begin{bmatrix}\Delta\phi\\\Delta\theta\\\Delta\psi\end{bmatrix}+\begin{bmatrix}\Omega_x-\omega_x\\\Omega_y-\omega_y\\\Omega_z-\omega_z\end{bmatrix}$$

The first term on the right-hand side of the resulting equation can be rejuggled so that the equation can be rewritten as:

$$\frac{d}{dt}\begin{bmatrix}\Delta\phi\\\Delta\theta\\\Delta\psi\end{bmatrix}=\begin{bmatrix}0 & -\Delta\psi & \Delta\theta\\\Delta\psi & 0 & -\Delta\phi\\-\Delta\theta & \Delta\phi & 0\end{bmatrix}\begin{bmatrix}\omega_x\\\omega_y\\\omega_z\end{bmatrix}+\begin{bmatrix}\Omega_x\\\Omega_y\\\Omega_z\end{bmatrix}-\begin{bmatrix}\omega_x\\\omega_y\\\omega_z\end{bmatrix}$$

Since $$\begin{bmatrix}\omega_x\\\omega_y\\\omega_z\end{bmatrix}=\begin{bmatrix}1 & 0 & 0\\0 & 1 & 0\\0 & 0 & 1\end{bmatrix}\begin{bmatrix}\omega_x\\\omega_y\\\omega_z\end{bmatrix}$$

the foregoing equation can be written as the Equation 14 in question:

$$\frac{d}{dt}\begin{bmatrix}\Delta\phi\\\Delta\theta\\\Delta\psi\end{bmatrix}=\begin{bmatrix}\Omega_x\\\Omega_y\\\Omega_z\end{bmatrix}-\begin{bmatrix}1 & \Delta\psi & -\Delta\theta\\-\Delta\psi & 1 & \Delta\phi\\\Delta\theta & -\Delta\phi & 1\end{bmatrix}\begin{bmatrix}\omega_x\\\omega_y\\\omega_z\end{bmatrix}\quad(14)$$

The question remains as to whether $$\begin{bmatrix}\Delta\phi\\\Delta\theta\\\Delta\psi\end{bmatrix}$$

can be treated as a vector. Reference is made to "Classical Mechanics" by Herbert Goldstein, Addison-Wesley, Cambridge, Mass., 1950, page 129, lines 6 and 7. Quoting these lines from Goldstein: "... Thus $d\bar{\Omega}$ has the properties of a vector in all respects except with regard to its behavior under improper rotations."

The Euler angles in the order $\theta$, $\phi$, and $\psi$ describe the rotation from frame $B_0$ to frame $B$. The terms $\omega_x$, $\omega_y$, and $\omega_z$ are the preprogrammed roll-rate, pitch-rate, and yaw-rate, respectively, and the terms $\Omega_x$, $\Omega_y$, and $\Omega_z$, are the measured roll-rate, pitch-rate, and yaw-rate, respectively.

Using Equation 4 and modifying Equations 12 and 13 to include the effect of the small attitude perturbations, $\Delta\phi$, $\Delta\theta$, and $\Delta\psi$, we can arrive at the following set of perturbation equations which completely describe "small" deviations or errors of the actual body frame B from the preprogrammed or nominal body frame $B_0$:

$$\frac{d\Delta\bar{R}}{dt}=P(t)\Delta\bar{R}+\Delta\bar{V} \quad (12)$$

$$\frac{d(\Delta\bar{V})}{dt}=P(t)\Delta\bar{V}+\bar{a}-T\bar{a}_0 \quad (15)$$

where $\Delta\bar{a}=\bar{a}-T\bar{a}_0$, from (13), and (16) below.

$$\frac{d}{dt}\begin{bmatrix}\Delta\phi\\\Delta\theta\\\Delta\psi\end{bmatrix}=\begin{bmatrix}\Omega_x\\\Omega_y\\\Omega_z\end{bmatrix}-T\begin{bmatrix}\omega_x\\\omega_y\\\omega_z\end{bmatrix} \quad (14)$$

where $\bar{a}$ is the measured "g-less" acceleration, $\bar{a}_0$ is the nominal acceleration, and T is the "small" rotation matrix from $B_0$ to B, namely:

$$T=\begin{bmatrix}1 & \Delta\psi & -\Delta\theta\\-\Delta\psi & 1 & \Delta\phi\\\Delta\theta & -\Delta\phi & 1\end{bmatrix} \quad (16)$$

It is apparent that Equations 12, 14, and 15, which are all written with reference to components in the actual body frame, comprise a more descriptive set of perturbation navigational equations than did Equations 12 and 13.

The P-Matrix perturbation Equations 12, 14, and 15, which explain the source of errors, then, provide guidance and control engineers a basis for designing and analyzing strapped-down guidance and control systems.

*Reduction to planer case*

Many guidance problems require maneuvering only within a plane. If this plane is assumed to be the pitch plane formed by $x$, $z$ axes of the craft then:

$$\bar{a}_0=a_{x_0} \text{ and } \bar{\omega}=\omega_{y_0}$$

Equations 12, 14, and 15 can then be written:

$$\frac{d}{dt}\begin{bmatrix}\Delta_x\\\Delta_y\\\Delta_z\end{bmatrix}=\begin{bmatrix}0 & 0 & -\omega_{y_0}\\0 & 0 & 0\\\omega_{y_0} & 0 & 0\end{bmatrix}\begin{bmatrix}\Delta_x\\\Delta_y\\\Delta_z\end{bmatrix}+\begin{bmatrix}\Delta V_x\\\Delta V_y\\\Delta V_z\end{bmatrix} \quad (12a)$$

$$\frac{d}{dt}\begin{bmatrix}\Delta V_x\\\Delta V_y\\\Delta V_z\end{bmatrix}=\begin{bmatrix}0 & 0 & -\omega_{y_0}\\0 & 0 & 0\\\omega_{y_0} & 0 & 0\end{bmatrix}\begin{bmatrix}\Delta V_x\\\Delta V_y\\\Delta V_z\end{bmatrix}+$$

$$\begin{bmatrix}a_x\\a_y\\a_z\end{bmatrix}-\begin{bmatrix}1 & \Delta\psi & -\Delta\theta\\-\Delta\psi & 1 & \Delta\phi\\\Delta\theta & -\Delta\phi & 1\end{bmatrix}\begin{bmatrix}a_{x_0}\\0\\0\end{bmatrix} \quad (15a)$$

$$\frac{d}{dt}\begin{bmatrix}\Delta\phi\\\Delta\theta\\\Delta\psi\end{bmatrix}=\begin{bmatrix}\Omega_x\\\Omega_y\\\Omega_z\end{bmatrix}-\begin{bmatrix}1 & \Delta\psi & -\Delta\theta\\-\Delta\psi & 1 & \Delta\phi\\\Delta\theta & -\Delta\phi & 1\end{bmatrix}\begin{bmatrix}0\\\omega_{y_0}\\0\end{bmatrix} \quad (14a)$$

Equations 12a, 15a, and 14a can be expanded to scalar form:

$$\Delta\dot{x}=-\omega_{y_0}\Delta z+V_x \quad (17)$$

$$\Delta\dot{y}=\Delta V_y \quad (18)$$

$$\Delta\dot{z}=\omega_{y_0}\Delta x+V_z \quad (19)$$

wherein (17), (18), (19) define rates of displacements from nominal directions.

$$\Delta \dot{V}_x = \omega_{y_0} \Delta V_z + a_x - a_{x_0} \quad (20)$$

$$\Delta \dot{V}_y = a_y + \Delta \psi a_{x_0} \quad (21)$$

$$\Delta \dot{V}_z = \omega_{y_0} \Delta V_x + a_z - \Delta \theta a_{x_0} \quad (22)$$

wherein (20), (21), (22) define acceleration of body perturbation from nominal motion $$\Delta \dot{\phi} = \Omega_z - \Delta \psi \omega_{y_0} \quad (23)$$

$$\Delta \dot{\theta} = \Omega_y - \omega_{y_0} \quad (24)$$

$$\Delta \dot{\psi} = \Omega_z + \Delta \phi \omega_{y_0} \quad (25)$$

wherein (23), (24), (25) define perturbation attitude rates of body with respect to nominal.

Equations 20 through 25 are used to formulate four guidance schemes. While two of these schemes alpha 1 and alpha 2 are currently being used in many booster rocket systems, and may be used for comparison, two others, alpha 3 and alpha 4 are new to the state-of-the-art in guidance.

APPLICATION OF THE PERTURBATION EQUATIONS TO A SPECIFIC EXAMPLE

The P-Matrix equations are applied below to a specific example. Four guidance techniques are devised by various assumptions in the P-Matrix equations. The four systems are analyzed through a simple error analysis which provides a basis for comparing accuracy.

VEHICLE OUT-OF-PLANE MOTION

If the P-Matrix equations are reduced to planar motion as shown in Equations 17 through 25, then the out-of-plane motion is uncoupled from the in-plane motion. This result is expected because of the assumptions used in reducing the P-Matrix equations to the planar case. The uncoupled result is important because it provides common yaw and roll axes to the four guidance techniques to be devised for motion in the x-z plane.

Consider the two small angular rotations $-\Delta \psi$ and $+\Delta \phi$ given in the second terms in the right sides of error Equations 26 and 27:

$$\Delta \dot{\psi} = \Omega_z + \Delta \phi \omega_{y_0} \quad (26)$$

$$\Delta \dot{\phi} = \Omega_x - \Delta \psi \omega_{y_0} \quad (27)$$

The output of a miniature integrating rate gyro (MIG) in the roll axis is:

$$\text{Output} = \int (\Omega_x + \text{torque}) dt \quad (28)$$

Thus, if the roll responsive MIG is torqued by the amount in the second term of the right side of (27), $-\omega_{y_0} \Delta \psi$, the MIG output is $\Delta \phi$. If the error signal, $\Delta \phi$, is subsequently nulled through the roll axis autopilot, then the second term on the right side of Equation 26 is zero and the output of the yaw MIG is $\Delta \psi$. The angular out-of-plane motion of the vehicle, then, can be controlled by using these characteristics.

Having considered angular motion, linear out-of-plane motion of the vehicle or its translation can be controlled by nulling the y-axis linear velocity error described by Equation 29 or Equation 21. That is with the control of angular out-of-plane deviations, the nulling of the translational out-of-plane eror is the remaining concern. To this end, we null the velocity error, $\Delta V_y$, which is the output of:

$$\Delta V_y = a_y + \Delta \psi a_{x_0} \quad (29)$$

The body axis acceleration, $a_y$, is measured with a lateral accelerometer and summed with the product of the output of the yaw miniature integrating gyroscope, MIG, and the preprogrammed nominal x-axis axial acceleration.

FIGURE 4 is a functional block diagram of a typical yaw-roll scheme which implements (26), (27), and (29) in a nulling sense. In FIGURE 4, a yaw miniature integrating gyro (MIG), 20, supplies an output in accordance with the magnitude of yaw of the vehicle substituting the value of $\Delta \phi$ in (29) and (27), the output from gyro 20 is transmitted via conductor 21 to a variable gain device 22. Gain device 22 varies the gyro signal in accordance with the nominal or programmed acceleration along the $x$ axis which gain varies with time from launch of the vehicle. The output from the gain device 22 is transmitted via conductor 23 to a first summer 24. A second input to the summer is provided by a lateral accelerometer 27 sensing lateral acceleration along the $y$ axis by conductor 28 so that the output from summer 24 on conductor 30 is in accordance with (29) or (21), $\Delta \dot{V}_y$. This quantity is an input to integrator 31 represented as $1/s$ having in turn (its output, $\Delta V_y$), transmitted via conductor 32 to a fixed gain device 33. The output from gain device 33 is transmitted to a second summer 34. A second input to summer 34 is provided by the output of summer 24 through conductors 30, 36, and the fixed gain device 37, via conduction means 38. The output of summer 34 is supplied through conductor 40 to a third summer 41. Summer 41 receives a second input from the yaw gyro 20 which is preconditioned by passage through conductor 43, gain 44, and shaping network 46, and conductor 47. Shaping network 46 provides lag and lead effects in its output, having a transfer function $$\frac{1 + T_1 s}{1 + T_2 s}$$

with $T_1$ greater than $T_2$. The output of third summer 41 is transmitted via conductor 48 to a yaw thrust deflector 49 for yaw control of the craft.

For roll control purposes, the output of gyro 20 is transmitted through conductor 51 to a gain device 52. Gain device 52 varies in accordance with the programmed vehicle pitch-rate which is programmed with time from vehicle launch. The output of device 52 is transmitted via conductor 53 to the torquer of a roll miniature integrating gyro (MIG) 54, see (27). The output of gyro 54 which is the bank command signal, $\phi$, is transmitted via conductor 55 to a fixed gain device 56. The output of device 56 is transmitted through conductor 57, shaping network 58, with a transfer function $$\frac{1 + T_3 s}{1 + T_4 s}$$

wherein $T_3$ is greater than $T_4$, conductor 59, to the roll thrust deflector 60 of the craft.

Since this described roll-yaw technique can be used for all in-plane control under consideration in this specification, the remainder of the specification will be devoted to considerations of in-plane motion only.

ALPHA ONE CONFIGURATION

The first scheme of in-plane motion control is devised by considering the P-Matrix equations in their most elementary form. The resulting scheme, as shown in FIGURE 5, is called "Alpha One."

Consider the linear motion error equations for $\Delta \dot{V}_x$ and $\Delta \dot{V}_z$. If it is assumed that $$\Delta \dot{V}_x = \Delta \dot{V}_z = \Delta V_x = \Delta V_z = 0$$

and that the vehicle or aircraft always flies at the programmed pitch-rate (i.e., $\Omega_y = \omega_{y_0}$), which is based on physical factors affecting the vehicle in flight such as range, thrust direction, vehicle weight, etc., then a very simple guidance scheme results. The alpha one scheme is identical to several current guidance schemes. While not resulting in a new technique, the P-Matrix formulation is used to explain an existing one. In FIGURE 5, which is a functional block diagram of this type of system, a programmer 64 supplies an output, $\omega_{y_0}$, via conductor 65 to a pitch integrating gyro 66. The information on conductor 65 is the nominal or programmed pitch-rate for the vehicle. This is a function of time from launch. This signal varies in accordance with the position of the vehicle along its ideal trajectory during the boost period or powered flight following launch of the vehicle. Gyro 66 may be of conventional type and includes a torque motor for precessing the gyro about its sensitive axis. Thus, the information on conductor 65 energizes the torquer of gyro 66 and causes precession of the gyro 66 about its sensitive axis in accordance with the programmed pitch-rate of the craft. The gyroscope has a pick-off for supplying an output on conductor 67 proportional to the pitch error, $\Delta\theta$. The gyro 66 is affected by the pitch rate of the craft or vehicle 71. If the craft's pitch rate and the programmed rate appearing on conductor 65 are identical, there will be no output on conductor 67. If there is a difference the error, $\Delta\theta$, is transmitted via conductor 67 to a gain device 68 having the transfer function $$\frac{1+T_5 s}{1+T_6 s}$$

with $T_5$ greater than $T_6$. The output of device 68 is conditioned by shaping network 69 and the conditioned signal is the input to a pitch thrust deflector 70 which controls the vehicle 71 about its pitch axis.

ALPHA TWO CONFIGURATION

The next degree of complexity in considering the P-Matrix equation is to assume that the normal errors do not exist. The resulting scheme, shown in FIGURE 6, will be named "Alpha Two." In this case, also the P-Matrix formulation is used to describe an existing system, rather than providing a new technique.

Again, consider the equations for $\Delta\dot{V}_x$ and $\Delta\dot{V}_z$. If it is assumed that $\Delta\dot{V}_z = \Delta V_z = 0$, then $\Delta\dot{V}_x = a_x - a_{x_0}$. If $\Delta V_x$ is not used as a steering function, i.e., to control attitude, then it need not be continuously computed. In this case, some preset terminal velocity equal to the $$\int_0^T a_{x_0} dt$$

would be compared to the integrated output of an axial accelerometer. When the two are equal, thrust, is terminated.

The addition of the axial integrating accelerometer 80 to the Alpha One system of FIGURE 5 is shown in FIGURE 6. It should be noted that a thrust cutoff system in addition to the axial accelerometer and thrust cutoff displayed in 79 is required.

Thrust cutoff logic 79 comprises an integrating axial accelerometer 80 which provides an output $V_x$, which is transmitted via conductor 81 to a summing device 82. A second input to summer 82 is supplied by conductor 83. The information or signal on 83 is with the nominal or programmed cutoff "velocity"$-V_x$. The output of summing device 82 is transmitted through conductor 84 to the thrust cutoff system of the vehicle. If there is no output on conductor 84 the actual velocity along the $x$ axis of the vehicle and its nominal velocity are the same, so that, no additional thrust is required.

ALPHA THREE CONFIGURATION

The third degree of complexity considered is to ignore the cross-coupling terms in the linear motion error equations. The alpha three system is deemed a novel guidance system. The resulting system, shown in FIGURE 7 in functional form, is named "Alpha Three." This system is Alpha Two with a portion of P-Matrix guidance added.

Consider the P-Matrix error equations with the cross-coupling terms of Equations 20, 22 involving the $x$ and $z$ axes ignored. These equations are:

$$\Delta\dot{V}_x = a_x - a_{x_0} \qquad (30)$$
$$\Delta\dot{V}_z = a_z - \Delta\theta a_{z_0} \qquad (31)$$

If it is again assumed that $\Delta V_x$ will not be used as a steering signal on the attitude control system of the vehicle, then Equation 30 provides propulsion or thrust termination signal (see FIGURE 7) similar to that used in the Alpha Two system, comprising an axial velocity meter 190 supplying an output, U, in accordance with the velocity of the craft along its $x$ axis to the differential 91. Differential 91 receives an input of opposite sign via conductor 92 which is the nominal or programmed velocity of the craft along its $x$ axis as a function of time from launch. The output differential 91 is supplied by conductor 93 to a thrust cutoff logic.

If Equation 31 be integrated and the resulting error $\Delta V_z$ nulled, or made equal to zero, then the resulting system for controlling pitch defined by the integration of the right side of (31) should give good correction for normal or $z$ axis errors such as result from thrust misalignment and winds.

Major additions in the Alpha Three configuration of FIGURE 7 to the Alpha Two system of FIGURE 6 are one normal accelerometer 100, one time variable gain 104, and one integrator 114 arranged so that the output of the normal accelermeter 100 sensing craft accelerations along its $z$ axis is supplied to a differential 102. The output of the pitch MIG gyro 66 is supplied through conductors 67 and 103 to the time variable gain device 104 whose output is the time-varying reference or normal acceleration of the craft along its $x$ axis (see Equation 31). The output of the gain device 104 is supplied to the summing device 102 to reinforce the other input to summer 102 having as its output $\Delta V_z$ which is supplied by conduction means 113 to integrator 114 to provide the resulting $\Delta V_z$. The output of the gain device 104 is transmitted to the differential 102. The output of differential 102 is the difference between the signal on 101 and the signal on 104 and is transmitted via 113 to integrator 114. The output of integrator 114 is $\Delta V_z$. The output of integrator 14 is supplied through a fixed gain device 116 to a summing device 118 which in addition to having a second input from shaping network 69 also receives a third input from conduction means 113, conduction means 120, fixed gain device 127. All of the inputs to summing device 118 are of the same sign and thus reinforce each other. The output of summing device 118 is supplied to the pitch thrust deflector sytem 70 for control of pitch attitude of the vehicle about its $y$ axis. It should be noted that the time variable gain could be replaced by a multiplying circuit, using the output of the axial accelerometer.

ALPHA FOUR CONFIGURATION

The fourth and last degree of complexity considered is based on the linear motion equations precisely as shown in the formulation. The resulting novel system has been named Alpha Four and is illustrated in FIGURE 8.

Consider the velocity of rate error equations previously derived and express in (20), (22).

$$\Delta\dot{V}_x = a_x - a_{x_0} - \omega_{y_0}\Delta V_z \qquad (32)$$
$$\Delta\dot{V}_z = a_z - \Delta\theta a_{x_0} + \omega_{y_0}\Delta V_x \qquad (33)$$

The first attempt to work with these equations might be to integrate them and null the resulting velocity errors. However, the simultaneous nulling of both $\Delta V_x$ and $\Delta V_z$ would require control of two physical parameters, i.e., both thrust magnitude and direction. Since control of the thrust magnitude requires a throttleable engine which is usually not available, we resort to physical reason and ask: "Do we wish, or is it necessary, to null $\Delta V_z$ if we have a $\Delta V_x$ error?". Probably not, as can be seen in a very simple example.

Consider an artillery cannon firing a shell. If the muzzle velocity is too high and consequently results in a positive range error, do we wish to raise or lower the barrel elevation for the next round to correct the error? The answer depends upon the original elevation of the cannon barrel. Based on a flat, atmosphereless earth we would lower the barrel if it was originally at greater than 45 degrees but raise it if it was originally at less than 45 degrees. In both cases we have caused a correction which induces a velocity normal to the nominal trajectory of the first round. Further, the direction and magnitude of this normal velocity correction, or $\Delta V_z$, will be dependent upon the total velocity vector, in this case muzzle velocity, of the shell.

By analogy then we can assume that a guidance system for a vehicle based on Equations 32 and 33 will require steering signals for changing craft attitude rather than nulling signals. Further, the steering signals will be functions of time and will be based on the nominal or programmed trajectory.

To evaluate an Alpha Four system of FIGURE 8 responsive to both Equations 32, 33, then it is necessary to pick a nominal or programmed trajectory. For the purpose of this paper a short-range impact type of trajectory was chosen. The error in range ($\Delta D$) is assumed to be $$\Delta D = \frac{\partial D}{\partial V_x} \Delta V_x + \frac{\partial D}{\partial V_z} \Delta V_z \quad (31)$$

If the earth be assumed flat and atmosphereless, then:

$$D = \frac{V_x^2}{g} \sin 2\gamma \quad (35)$$

and $$\frac{\partial D}{\partial V_x} = \frac{2V_x}{g} \sin 2\gamma \quad (36)$$

$$\frac{\partial D}{\partial \gamma} = \frac{2V x^2}{g} \cos 2\gamma \quad (37)$$

$$\frac{\partial D}{\partial V_z} = \frac{1}{V_x} \frac{\partial D}{\partial \gamma} \quad (38)$$

substituting (36) annd (38) into (34) and setting the range error $\Delta D$ equal to zero:

$$\Delta V_z = -(\tan 2\gamma) \Delta V_x \quad (39)$$

It is noted in Equation 39 that as $\gamma$, the angle of the vehicle flight path to the horizontal, passes through 45 degrees, the gain on $\Delta V_x$ goes to infinity and also changes sign. The high gain can be avoided by switching out this feedback for a short period of time. However, the sign must be accounted for.

Equation 39, then, provides the amount of $\Delta V_z$ bias desired from (33) required to correct for a $\Delta V_x$ error derived from (32). The functional block diagram of a possible mechanization to provide such bias as shown in FIGURE 8 adds to the Alpha Three system of FIGURE 7 three time-variable gains and an integrator.

FIGURE 8 is to be considered in connection with Equations 32, 33 and 39. In FIGURE 8, an axial accelerometer 130 supplies an output $a_x$ on transmission means 131 to a summing device 132 in accordance with the sensed linear acceleration of the craft along its $x$ axis. A programmer 133 supplies a nominal or programmed acceleration $a_{x_0}$ of opposite sense to transmission means 134, 135 connected to summing device 132. The output of summer 132 on transmission means 136 thus is in accordance with the first two terms on the righthand side of Equation 32.

To provide the third term of the righthand side of the Equation 32 a negative feedback is supplied to a summing device 146 from a feedback transmission means 147 through a variable gain 148. Summing device 146 also receives a second input over conductor 136. The gain device 148 is adjusted in accordance with the programmed pitch rate of the craft which varies with time. The output $\Delta \dot{V}_x$ from summer 146 is supplied through transmission means 150 to integrator 151 so that the output of the integrator on transmission means 152 to the thrust cutoff logic is $\Delta V_x$ in accordance with Equation 32 integrated. In other words, the axial thrust velocity error is reduced to zero at engine cutoff.

The output of integrator 151 is supplied through transmission means 154 to a gain device 155 which is adjusted in accordance with time in proportion to the angular rate $\omega_{y_0}$ of the vehicle about its pitch axis as programmed. The output of gain device 155 is supplied to a summing device 156.

A miniature integrating rate gyro (MIG) 139 responsive to changes in craft pitch attitude supplies an output $\Delta \theta$ over transmission means 140 to a multiplier 141. Multiplier 141 receives a second input over transmission means 142 from programmer 133 to provide as its output the product $\Delta \theta a_{x_0}$ to a summing device 143. Summing device 143 as a second input receives from a normal accelerometer 144, sensing accelerations of the vehicle along its $z$ axis, the quantity $a_x$. The inputs to summing device 143 are of opposite sign in accordance with the first two terms on the righthand side of Equation 33.

Summing device 156 receives as a second input the output from summing device 143. The output of summer 156 is supplied in one case to an integrator 159 having in turn its output supplied to a further summing device 160. The summing device 160 receives a second input from a fixed gain device 161 connected to the output of summing device 156 which second input is a damping term. The output of summing device 160 in one instance is applied in feedback relation as stated by transmission means 147 to gain device 148 to summer 146 and is supplied in a second instance to a summer 164.

Summing device 164 receives a second input Equation 39 from conductor 154 through gain device 167 which varies the quantity $\Delta V_x$ in accordance with the tangent of $2\gamma$. The output of combining means 164 which is the difference between the two inputs supplied thereto is supplied to the pitch axis control system of the vehicle.

ERROR ANALYSIS RESULTS

The four systems considered were subjected to a simple error analysis. The reference trajectory was based on the following assumptions:
 (a) Flat, atmosphereless earth,
 (b) Constant gravity,
 (c) Vertical launch with nominal "gravity turn" to cutoff, and
 (d) Nominal range of 105 miles.

Major error sources were divided into two categories: physical errors in the vehicle or craft booster rocket and component errors in the guidance system. Booster rocket errors include thrust magnitude and direction (thrust alignment). Guidance system errors include gyro drift, programmer gain and bias errors, accelerometer gain and bias, and integrator drifts.

Total system performance capability is limited by the accuracy of the axial accelerometer. Unless the axial accelerometer is accurate to approximately 0.01 percent, there is little advantage in mechanizing beyond the system. The same is true of the programmed $a_{x_0}$ gain and bias.

It will now be apparent that there has been provided a novel guidance system for a vehicle which utilizes body mounted sensors in a novel arrangement to provide higher accuracies and thus improved operation over previous body mounted sensor control apparatus.

What is claimed is:
1. In a self-contained guidance control apparatus for a vehicle having a trajectory above the earth and having body mounted sensors comprising an accelerometer sensing normal acceleration $a_z$ along the body axis $z$, a precessible gyro providing changes in pitch angle, $\Delta \theta$, and a programmer for providing an output, $\omega_0$, varying with points along a nominal trajectory for the vehicle, in combination: means precessing said gyro at the nominal rate, $\omega_0$, whereby the gyroscope provides an output $\Delta \theta$, a gain device modifying $\Delta \theta$ in accordance with the nom- inal acceleration based on the nominal trajectory said gain device being adjusted with time; means combining the sensed vehicle acceleration $a_z$ and the modified value of $\Delta\theta$, to provide a quantity $\Delta V_z$; means integrating $\Delta \dot{V}_z$; means modifying $\Delta V_z/S$ by a fixed gain $K_2$; means modifying $\Delta \dot{V}_z$ by a fixed gain $K_1$; means modifying $\Delta\theta$ by a variable gain $K_\theta$; a shaping network modifying $K_\theta \Delta\theta$, means for combining $K_\theta \Delta\theta$, K, $\Delta V_z$, and $$\frac{K_2}{s} \Delta V_z$$

for controlling attitude of said vehicle.

2. In a guidance system for a vehicle having means wherein a programmed quantity such as pitch attitude and a similar quantity derived from a response of the craft while in its trajectory are compared and supply an output whereby to control vehicle attitude changing means to equate the two quantities, further means sensing vehicle normal acceleration $a_z$ along the body axis z, providing a first signal, a summing device receiving said first signal, gain means adjusted in accordance with programmed forward acceleration $a_{x_0}$ and varying with time modifying the output, means supplying the modified output to the summing device to oppose the first signal, an integrator receiving the output of the summing device, and means for additionally controlling the attitude changing means from the integrator.

3. The apparatus of claim 2, with the output $\int \dot{V}_z$ from the summing device additionally controlling the attitude changing means.

4. In pitch axis control apparatus for a launched vehicle, an axial accelerometer providing a first output, $a_x$; a vehicle nominal trajectory programmer providing a second output $a_{x_0}$; a first summing means combining in opposition said two outputs to provide a sum $\Delta \dot{V}_x$; a first integrator providing an integration of $\Delta \dot{V}_x$; means controlling the cutoff thrust means of the vehicle from the integrator; additional gain control means modifying the output of the integrator in accordance with programmed nominal pitch rate of the vehicle along its trajectory; a second integrator responsive to the modified output from the additional means and supplying an output for control of the vehicle in pitch.

5. The apparatus of claim 4 and means for opposing the control of the vehicle by the second integrator in accordance with the quantity $\Delta V_x/S$ modified by a funtion of the flight path angle of the craft.

6. The apparatus of claim 4, and means supplying as an input to the second integrator a quantity varying with $a_z - \Delta\theta a_{x_0}$, wherein $a_z$ is the sensed vehicle normal acceleration, $a_{x_0}$ is the vehicle programmed acceleration along the X axis, and $\Delta\theta$ is the change in pitch attitude of the craft.

7. The apparatus according to claim 4; further gain means modifying the output of the second integrator in accordance with the programmed pitch rate of the vehicle to provide a feedback quantity which is combined in opposition with the output of the first combining means.

8. In a guidance system for a vehicle having pitch attitude changing means, means for enabling the craft to follow a nominal trajectory comprising: an axial accelerometer sensing linear acceleration $a_x$ of the vehicle; a programmer supplying a signal $a_{x_0}$ in accordance with the desired linear acceleration of the vehicle corresponding to various points in its trajectory; a gyroscope providing an attitude signal $\Delta\theta$; a normal accelerometer supplying a signal $a_z$ in accordance with the vehicle acceleration along its z axis; first combining means for the output of the axial accelerometer and the programmer to provide an axial acceleration error; second combining means for the outputs of the programmer, gyro, and normal accelerometer to provide an acceleration error along the z axis of the vehicle; means for twice integrating the output of the first combining means; means for integrating once the output of the second combining means; and further means for controlling the pitch attitude of the craft from the two integrated quantiies.

9. The apparaus of claim 8, with a negative feedback from the output of the second integrator supplied to the input side of the first integrator.

10. The apparatus of claim 8 wherein the output of the second integrator is summed with an opposing quantity derived from the output side of the first integrator which output is modified in accordance with a function of the tangent of the flight path angle of the vehicle.

11. The apparatus of claim 8 wherein the output from the first integrator is utilized to control thrust cutoff logic for propulsive thrust of the vehicle.

References Cited

UNITED STATES PATENTS

| | | | |
|---|---|---|---|
| 2,373,074 | 2/1959 | Harris et al. | 244—14 |
| 3,164,340 | 1/1965 | Slater et al. | |
| 3,167,276 | 1/1965 | Moosbrugger et al. | 244—14 X |
| 3,188,019 | 6/1965 | Boutin | 244—14 |

RODNEY D. BENNETT, *Primary Examiner.*

BENJAMIN A. BORCHELT, *Examiner.*

M. F. HUBLER, *Assistant Examiner.*